United States Patent [19]
Griesemer

[11] Patent Number: 5,168,740
[45] Date of Patent: Dec. 8, 1992

[54] METHOD FOR PRODUCING DRAWN BORES IN SHEET-METAL PIECES

[76] Inventor: Albert Griesemer, Dorfwiese 3, D-5438 Westerburg-Gershasen, Fed. Rep. of Germany

[21] Appl. No.: 839,070

[22] Filed: Feb. 20, 1992

Related U.S. Application Data

[63] Continuation-in-part of Ser. No. 804,524, Dec. 10, 1991, abandoned, which is a continuation of Ser. No. 452,363, Dec. 19, 1989, abandoned.

[30] Foreign Application Priority Data

Dec. 24, 1988 [DE] Fed. Rep. of Germany ....... 3843890

[51] Int. Cl.⁵ ............................................. B21D 22/20
[52] U.S. Cl. ...................................... 72/349; 72/404; 72/347
[58] Field of Search ................. 72/325, 327, 333, 334, 72/335, 343, 347, 348, 350, 351, 356, 370, 379.2, 379.6, 404

[56] References Cited

U.S. PATENT DOCUMENTS

| | | | |
|---|---|---|---|
| 412,311 | 10/1889 | Van Wagenen et al. | 72/345 |
| 495,591 | 4/1863 | Knight et al. | 72/347 |
| 1,675,910 | 7/1928 | Riker | 72/325 |
| 1,908,162 | 5/1933 | Mihay | 72/348 |
| 2,308,953 | 1/1943 | Brown | 72/354 |
| 2,373,901 | 4/1945 | Lowery | 72/378 |
| 2,999,312 | 9/1961 | Schilberg | 72/348 |
| 3,010,126 | 11/1961 | Willcox | 10/152 R |
| 3,116,542 | 1/1964 | Niekamp | 72/379.2 |
| 3,387,481 | 6/1968 | Harvey et al. | 72/379.2 |
| 3,412,593 | 11/1968 | Price | 72/356 |
| 3,457,761 | 7/1969 | Brosseit | 72/325 |
| 3,479,979 | 11/1969 | Dunn | 72/377 |
| 3,824,675 | 7/1974 | Ballantyne | 29/523 |
| 4,899,569 | 2/1990 | Matsushita et al. | 72/379.2 |

FOREIGN PATENT DOCUMENTS

| | | | |
|---|---|---|---|
| 178180 | 4/1986 | European Pat. Off. | |
| 841436 | 6/1952 | Fed. Rep. of Germany | 72/340 |
| 58-35024 | 3/1983 | Japan | 72/347 |
| 39444 | 3/1984 | Japan | 72/253.1 |
| 222642 | 10/1986 | Japan | 72/335 |
| 175028 | 7/1990 | Japan | 72/351 |
| 395149 | 8/1973 | U.S.S.R. | 72/350 |
| 2552 | of 1884 | United Kingdom | 72/347 |
| 497 | of 1892 | United Kingdom | 16/387 |

OTHER PUBLICATIONS

German Pub. Application No. 2,907,414; pub. date Sep. 1980, 6 sheets of dwgs. and 16 pages of spec.

*Primary Examiner*—John Sipos
*Assistant Examiner*—Donald M. Gurley
*Attorney, Agent, or Firm*—Cushman, Darby & Cushman

[57] ABSTRACT

Drawn bores similar to a sleeve and provided with an inner thread are used as a substitute for nuts. The starting materials are flat sheet-metal blanks. In the course of step-by-step deformation with shaping tools, the wall thickness of the drawn bores decreases, compared to the starting material. This is true in particular with increased height of the drawn bores and sheet-metal blanks with larger surfaces. Accordingly, the invention is intended to recite a method according to which it becomes possible to produce high drawn bores, having a wall thickness comparable to the thickness of the original material, from sheet-metal blanks with large surfaces for highly stressed screw connections. This object is attained by means of a changed sequence of the step-by-step operation. Flat pressing of the sheet-metal piece is only performed after partial inward crimping has been started. This means that, unlike previously, the border area no longer is first fixed and maintained in a dressed condition during deformation, but is included in the deformation process and then is subsequently dressed again. The invention is of particular importance for metal construction work, namely for the manufacture of vehicles and apparatus.

8 Claims, 2 Drawing Sheets

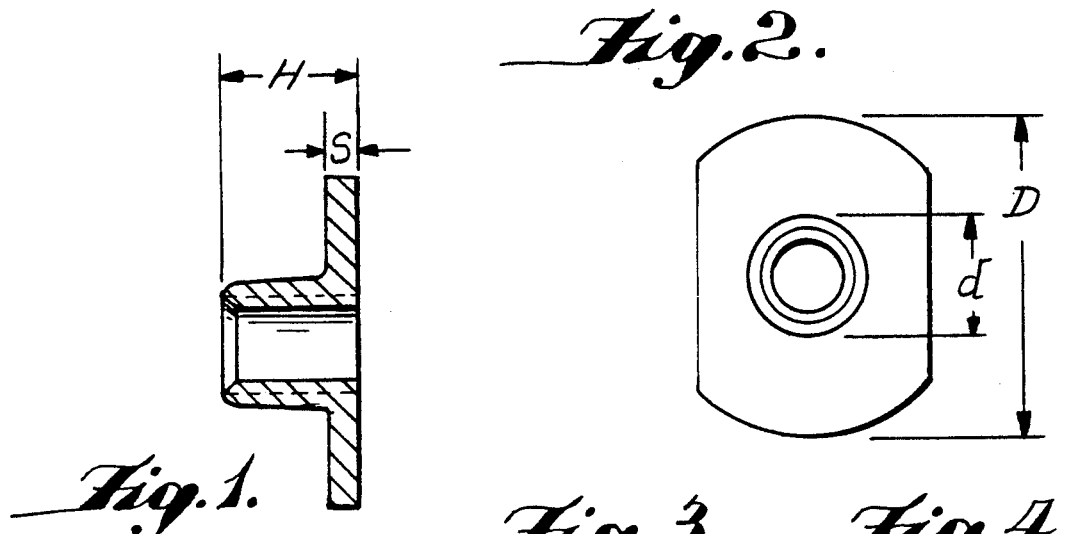
Fig. 2.
Fig. 1.
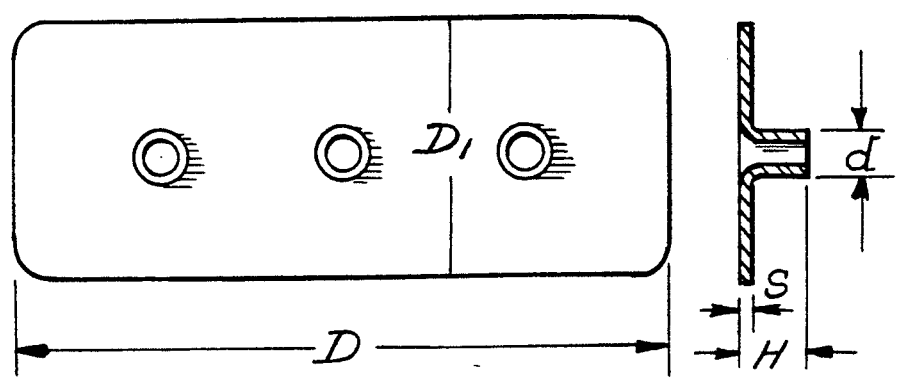
Fig. 3. Fig. 4.
Fig. 5.
Fig. 6.

METHOD FOR PRODUCING DRAWN BORES IN SHEET-METAL PIECES

This is a continuation-in-part of application Ser. No. 07/804,524, filed on Dec. 10, 1991, which was abandoned upon the filing hereof, which was a file wrapper continuation of application Ser. No. 07/452,363, filed Dec. 19, 1989, now abandoned.

FIELD OF THE INVENTION

The invention relates to a method for producing drawn bores in sheet-metal pieces where the sheet-metal piece is partially transformed step by step from its originally flat shape into the desired drawn bore with the help of shaping tools. This is accomplished by placing the sheet-metal piece on a lower part of a shaping tool provided with a recess and pressing it flat against the shaving tool. The sheet-metal piece is then crimped into the recess of the lower part by means of an upper part of the shaping tool.

BACKGROUND OF THE INVENTION

Sheet-metal pieces are here generally defined as pieces to be shaped, in particular stamped, bent and/or embossed pieces of sheet metal, metal strips or the like. The drawn areas comprise areas on such shaped pieces which are deformed to a greater extent. The drawn areas are similar to a sleeve or bush and are often called collars. As a rule, they are provided with an inner thread and are then used as substitutes for nuts. Such shaped pieces are used in various areas of metal construction, namely in the manufacture of vehicles and apparatus, but also in the electrical industry and other branches of industry.

The shaping operation is in the form of a deep drawing operation. Accordingly, as a rule the shaping tools comprise a lower part, which is a so-called drawing die with a suitable recess and an ejector contained therein and an as upper part, which is a so-called hold-down clamp or blank holder with a drawing punch contained therein.

To produce the desired drawn bores, the sheet-metal pieces are increasingly deformed in steps, namely starting with a flat shape, i.e. a flange, a round or a blank. The shaping operation of interest here may itself be a part of a total manufacturing process, namely the fabrication of finished shaped pieces from semi-finished products. All in all, various working steps may be used, such as stamping, bending, drawing, punching, embossing, cutting. As already mentioned, the entire shaping takes place step by step, i.e. a number of shaping tools are required to attain increasingly greater degrees of deformation. These tools must be passed successively in contact with the workpiece. Regarding the details of the shaping process, the piece to be shaped first must be placed o the lower part of the respective shaping tool and positioned there. As a rule, the lower part has a special receptacle for the workpiece. Underneath the receptacle is a recess which allows a bulging of the sheet-metal workpiece in accordance with the corresponding degree of deformation. In prior art methods, before being deformed at all, the portion of the sheet-metal piece which directly borders the area to be crimped, i.e., drawn, is pressed flat against the lower part with a hold-down clamp or blank holder being placed firmly on the sheet-metal piece and a certain surface pressure being generated afterwards. To reduce shock, the pressing forces are in general generated by springs.

After the sheet-metal piece has been fixed on the lower part, the respectively intended deformation is started by lowering the drawing punch out of the upper part in the direction of the lower part. The desired shaping step with a view to a finished shape is attained in cooperation with the drawing die. After the respective shaping, the sheet-metal piece can be ejected from the drawing die by means of the ejector.

The sequence for preparing, initiating and operating the desired deformation has been always the same in accordance with the custom so far and has been considered mandatory. In the same way, the amount of deformation considered from station to station is subject to fixed rules. For this purpose, the diameter of the round and the recess or drawing punch and the depth of the punch penetration have been brought into a fixed mathematical relationship to each other.

By means of the known process it is possible to provide threaded drawn portions in excess of the normal height of nuts (for example, 6 mm for M 6 threads). However, this must be qualified by stating that this is only successful in connection with rounds or flanges of small area. In part, the wall thickness of the drawn area is reduced in comparison to the thickness of the original material. This is because the pressing flat of the portions of the sheet metal piece bordering the area to be drawn prevents the flow of metal from this bordering portion into the drawn portion. Therefore, since the amount of metal available for drawing is limited by the pressing flat of the sheet metal piece, the greater the height of the drawing, the thinner the wall thickness must be. Quite often losses in wall thickness up to 25%, occasionally even up to 50%, based on the original material, must be tolerated. However, this may be satisfactory in drawn bores for normal screw connections.

But with increased collar height, the wall thickness if reduced to the extent that resistance to tear-out falls below the permissible minimum. The customary method thus permits normal screw connections at best, but not screw connections requiring very high tear-out resistance. This is true to even a greater extent for sheet-metal parts (rounds) having larger areas. It is not even possible to manufacture drawn bores for normal stress. In such cases, weld nuts or threaded sheet-metal nuts will have to be welded on instead, which, of course, requires extensive effort and increased cost.

SUMMARY OF THE INVENTION

An object of the present invention is to provide a method which makes it possible to produce, even from large surface workpieces or sheet-metal blanks, threaded or unthreaded drawn hollow collars of increased height and having a wall thickness similar to the thickness of the starting material. It is intended that such drawr collar bores could also be used for highly stressed screw connections and that the attachment by welding of welded or threaded sheet-metal nuts should no longer be required. Finally, it is intended to allow efficient and cost-effective production.

This object is being attained in accordance with the invention in a surprisingly simple way in that the flat pressing only takes place after inward forming or crimping to form the hollow collar has already begun.

As can be seen, a changed sequence of the work at the individual stations now applies. This runs counter to the customary operation. Up to now it has been a prerequisite for a defined deformation to first fix the portions of the blank directly bordering the area to be crimped, i.e., drawn, and to keep them dressed during deformation with the resultant thinning of the drawn wall thickness. Now, in accordance with the present invention, the border zones are first included in the deformation process and are dressed again later.

As has been shown in the course of many experiments, it is possible in this way to attain very great drawn bore collar heights even in large-surface rounds of sheet-metal blanks while maintaining the original metal thickness at the same time. The invention is based on the recognition that the first requirement for improvement of the previous results is for better conditions for the flow of material. Thus, metal is allowed to flow from the portions of the sheet metal piece bordering the area to be drawn into the drawn portion. Since the amount of metal available for drawing is not limited as in the conventional process, increased wall thickness in the drawn portion can be obtained as compared to the conventional process. In this way, it is possible to explain the improved results, even with sheet-metal blanks of small area, by means of comparatively unhampered flow of material. Although there will be some resultant thinning of the portion of the workpiece bordering the drawn portion, this thinning is not significant enough to compromise the desired strength of the finished piece.

Not only does the proposed method lead to improved results, it can also be designed to be energy-efficient, depending on the degree to which first the central area is being deformed and the border zones are subsequently dressed. With these design options, the problem of heat dissipation is less urgent.

To execute the method there is no requirement for special shaping tools or those changed in their design, so that no additional investment is required. As with the conventional method, it is possible to optimize the results by the correct choice and careful observation of the determining production criteria, such as speed of operation and deformation in connection with the respectively required lower and upper pressures as well as suitable lubricants, sliding and drawing means.

Flat pressing is advantageously performed after inward crimping at the respective station has already been half accomplished.

In accordance with a further suggestion flat pressing is performed shortly before the end of inward crimping.

Further details and advantages will be described below by means of the drawings for various products made by the method.

BRIEF DESCRIPTION OF THE DRAWINGS

FIG. 1 is a sectional view of a drawn bore as used for normal screw connections, FIG. 2 is a top view of the subject of FIG. 1, FIG. 3 is a top view of a drawn bore as it may be used for screw connections with high tear-out resistance, FIG. 4 is a sectional view of the subject of FIG. 3, FIG. 5 is a sectional view of a finished sheet-metal piece various threaded extruded bores, FIG. 6 is a top view of the subject of FIG. 5, and FIGS. 7(a)-(d) show the progressive step-by-step deformation of the drawn bore according to the present invention

DETAILED DESCRIPTION OF THE PREFERRED EMBODIMENTS

In accordance with FIGS. 1 and 2, the following parameters and approximate dimensions should be considered for screw connections for normal use, for example for a thread M 8: starting material of the thickness $s=2$ mm, diameter D of the round or flange$=25$ mm, exterior diameter d of the collar$=10$ mm and collar height $H=10$ mm. Because the drawn bore illustrated is formed from a sheet-metal blank with a small surface, it can also be produced in accordance with the already known method.

However, conditions are different for the drawn bores in the exemplary embodiment according to FIGS. 3 and 4. They can only be produced exclusively by means of the method according to the invention. The following parameters and approximate dimensions now hold, the thread (M 8) and thickness ($s=2$ mm) of the starting material remaining the same as in the embodiment shown in FIGS. 1 and 2: diameter D of the round or flange$=180$ mm/DI$=80$ mm, outer diameter d of the collar$=11.5$ mm and collar height $H=12-18$ mm.

Similar circumstances apply in connection with the further exemplary embodiment shown in accordance with FIGS. 5 and 6. The drawn bores can also only be produced by means of the method of the invention. The sheet-metal piece illustrated can otherwise be made in the customary manner.

The forming then is carried out by first commencing the inward crimping of the workpiece prior to flat pressing of the area surrounding the portion where the collar is to be formed. As noted above, this will allow free flow of metal from an uncrimped portion of the workpiece to the collar forming portion of the blank. Flat pressing will effectively lock a major portion of the workpiece between the upper and lower tool parts and thus inhibit further metal flow from the uncrimped portion of the workpiece. The flat pressing may be delayed until the collar is half formed or may be delayed until shortly before the end of the collar forming inward pressing or crimping of the blank.

Figure 7A:
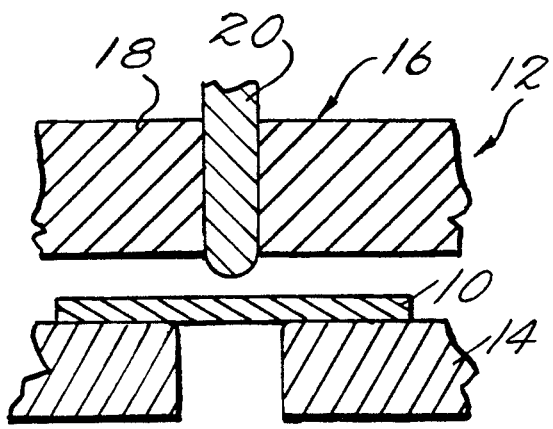
Figure 7B:
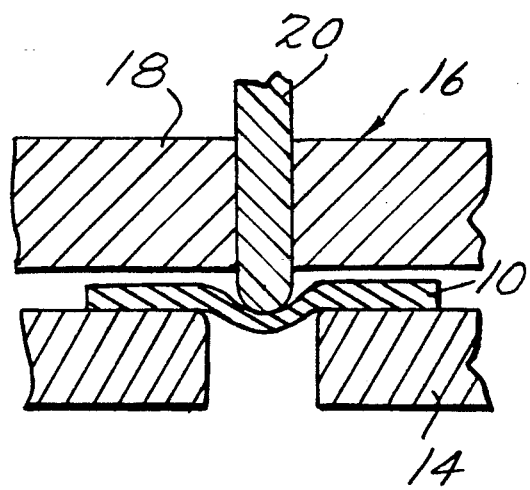
Figure 7C:
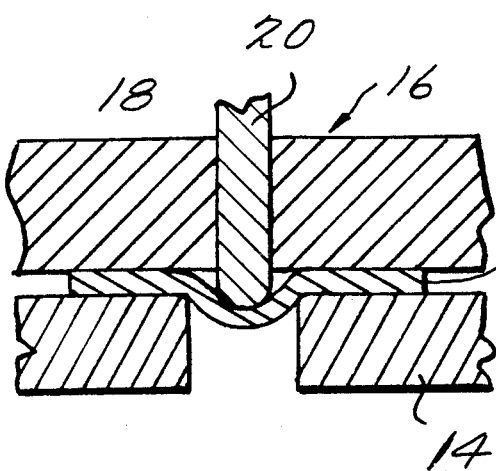
Figure 7D:
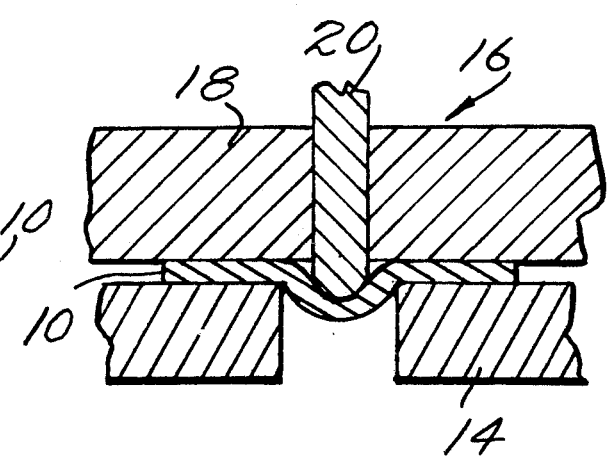

The crimping id done in small increments, step by step, with no more than 2 mm collar height created per step. Thus, to create a collar of 12 mm height from a flat piece at least 6 steps will be required and 12 or more steps can be used. It is preferably that each step progressively increases collar height with shaping tools having the same diametrical dimensions, and does not progressively increase the diameter of the drawn bore. Otherwise, increasing the bore diameter from step to step will decrease the wall thickness of the drawn bore. This is best seen in FIGS. 7(a)-(d). Workpiece 10 is placed in shaping tool 12 having a lower recessed part 14 and upper part 16. Upper part 16 includes die body 18 and extending die 20. Upper portion 16 of the shaping tool is brought down with extending die 20 crimping a portion of workpiece 10 into the lower recessed portion 14, as seen in FIG. 7(b). After the crimping has begun, upper die body 18 is pressed flat against workpiece 10 to inhibit further flow of metal form the surrounding area of the workpiece into the drawn bore of the workpiece, as seen in FIG. 7(c). After the flat pressing, the extending die 20 continues the crimping of the sheet metal piece 10 into the lower recessed portion 14, as seen in FIG. 7(d). Upper portion 16 is then raised. These steps are then repeated with a progressively extended extending die 20 until the desired bore height is achieved. After the drawn bore has attained the desired height, it can be finished by piercing, threading, etc. The entire step by step operation can be performed in a shaping tool having a single work station, i.e., a single extending die, or it can be performed in a shaping tool having numerous progressive work stations, which may also perform other operations on the workpiece. As discussed above, the tooling itself is no different than conventional tooling except in the sequencing of operations the tooling performs on the workpiece.

What is claimed is:

1. A method for producing a drawn bore in a sheet metal piece where the sheet metal piece is partially transformed in small increments step by step form its original flat shape into the desired drawn bore of a selected height above the surface of the sheet metal piece by means of at least one shaping tool having a lower recessed part and an upper part, comprising the steps of:

placing the sheet metal piece on the lower recessed part of the at least one shaping tool;

a) crimping a portion of the sheet metal piece into a recess of the lower recessed part by means of the upper part of the at least one shaping tool while allowing metal to flow from a surrounding, uncrimped portion of the sheet metal piece to the crimped portion;

b) pressing the uncrimped portion of the sheet metal piece flat against the lower recessed part to inhibit further metal flow from the uncrimped portion, said flat pressing being performed only after the crimping has started;

c) continuing the crimping of the sheet metal piece into the recess while pressing the uncrimped portion; and d) repeating steps a) through c) until the drawn bore attains the desired height above the surface of the sheet metal piece.

2. A method in accordance with claim 1, wherein the flat pressing is performed after the crimping has been half accomplished.

3. A method in accordance with claims 1 or 2, wherein the flat pressing is performed shortly before the end of the crimping.

4. A method in accordance with claim 1, wherein the crimping is performed in stages on a plurality of progressive shaping tools, each having a lower recessed part and an upper part.

5. A method for producing a drawn bore having substantially cylindrical sides in a sheet metal piece where the sheet metal piece is partially transformed in small increments step by step from its original flat shape into the desired drawn bore of a selected height above the surface of the sheet metal piece by means of at least one shaping tool having a lower recessed part and an upper part, comprising the steps of:

placing the sheet metal piece on the lower recessed part of the at least one shaping tool;

a) crimping a portion of the sheet metal piece into a recess of the lower recessed part b means of the upper part of the at least one shaping tool while allowing metal to flow from a surrounding, uncrimped portion of the sheet metal piece to the crimped portion;

b) pressing the uncrimped portion of the sheet metal piece flat against the lower recessed part to inhibit further metal flow form the uncrimped portion, said flat pressing being performed only after the crimping has started and before the crimping has ended; and c) repeating steps a) through b) until the drawn bore attains the desired height above the surface of the sheet metal piece.

6. A method in accordance with claim 5, wherein the flat pressing is performed after the crimping has been half accomplished.

7. A method in accordance with claims 5 or 6, wherein the flat pressing is performed shortly before the end of the crimping.

8. A method in accordance with claim 5, wherein the crimping is performed in stages on a plurality of progressive shaping tools, each having a lower recessed part and an upper part.

* * * * *